US008515992B2

(12) United States Patent
Kelley et al.

(10) Patent No.: US 8,515,992 B2
(45) Date of Patent: Aug. 20, 2013

(54) METHOD AND SYSTEM FOR CREATING EXECUTABLE DOCUMENT AND REPOSITORY LINKS WITHIN VIRTUAL WORKPLACE ENVIRONMENTS

(75) Inventors: Edward E. Kelley, Wappingers Falls, NY (US); Tijs Y. Wilbrink, Populierendreef (NL)

(73) Assignee: International Business Machines Corporation, Armonk, NY (US)

( * ) Notice: Subject to any disclaimer, the term of this patent is extended or adjusted under 35 U.S.C. 154(b) by 1555 days.

(21) Appl. No.: 11/621,238

(22) Filed: Jan. 9, 2007

(65) Prior Publication Data
US 2008/0168467 A1    Jul. 10, 2008

(51) Int. Cl.
*G06F 17/30*    (2006.01)

(52) U.S. Cl.
CPC ................................ *G06F 17/30424* (2013.01)
USPC .......................................... 707/770; 707/709

(58) Field of Classification Search
USPC .................... 707/1, 705, 709, 770; 715/222; 705/1
See application file for complete search history.

(56) References Cited

U.S. PATENT DOCUMENTS

| 6,272,485 B1 * | 8/2001 | Sragner ............................ 707/1 |
| 6,532,488 B1 | 3/2003 | Ciarlante et al. |
| 6,594,819 B1 | 7/2003 | Ciarlante et al. |
| 6,772,229 B1 | 8/2004 | Achacoso et al. |
| 2006/0173969 A1 | 8/2006 | Wilson |
| 2008/0046807 A1 * | 2/2008 | Margitich et al. ............. 715/222 |

OTHER PUBLICATIONS

PCT Search Report, PCT/EP2007/064240, Mailed on Dec. 19, 2007.
Statement in Accordance With the Notice From the European Patent Office Dated Oct. 1, 2007 Concerning Business Methods (OJ Nov. 2007; p. 592-593).

* cited by examiner

*Primary Examiner* — Shahid Alam
(74) *Attorney, Agent, or Firm* — Cantor Colburn LLP

(57) ABSTRACT

A method for creating executable document and repository links within a virtual workplace environment includes capturing steps corresponding to a user navigation through a central database accessible by defined members of a collaborative groupware application, and creating and inserting one or more executable scripts as an attachment to an electronic communication initiated by the user, the executable scripts corresponding to the captured steps taken in accessing a specific database file, wherein any of the defined members of the collaborative groupware application receiving the electronic communication has the capability of directly navigating to the location of the specific database file by activating the attachment.

20 Claims, 3 Drawing Sheets

METHOD AND SYSTEM FOR CREATING EXECUTABLE DOCUMENT AND REPOSITORY LINKS WITHIN VIRTUAL WORKPLACE ENVIRONMENTS

BACKGROUND

The present invention relates generally to collaborative software systems within computer networks, and, more particularly, to a method and system for creating executable document and repository links within virtual workplace environments.

Workgroup software or groupware applications, which provide multiple users with the ability to collaborate on projects, are extremely powerful and increasingly popular tools for the performance of work by teams of people. Many such applications are available for such tasks as editing documents, holding chats and discussions, networking employment opportunities, managing accounts, providing help, and holding auctions, to name a few.

Traditionally, the use of a groupware application required the license of a groupware software product and the installation of the product on a server computer and possibly the client computers of the users. This limited the availability of groupware to those with the computer and financial resources to obtain and set up the necessary hardware and software components. A new type of groupware, terms user initiated groupware or UIG, was originally introduced in the form of the TeamRoom® groupware available from Lotus Development Corp. of Cambridge, Mass. Using the Instant! TeamRoom® groupware (or server version TeamRoom Plus® from IBM), a user having a personal computer and access to the Internet can set up a secure collaboration site, chose the team members, invite them in, and collaborate on a project by sharing documents and conversations. The user setting up the collaboration are site subscribes to the use of the group collaboration software by paying for the time the users actually use the collaboration site, thus saving on the expense of purchasing the necessary hardware and software.

One inconvenience associated with existing groupware products such as TeamRoom® relates to the sending of documents from databases to other participants within the defined collaborative group. Often times it is difficult to initially locate a particular document within the source database, If one member of a group sends an e-mail communication to other members with the subject document attached thereto, the other members may open and view the attachment document itself. However, this is not the same as another user being able to independently locate the document in the source database, which can be a difficult task.

Accordingly, it would be desirable for one user of a collaborative software product to enable other users to be able to independently locate a given document within a source database such that the other user(s) may, for example, view other related documents and view (at a later time) any updates to the original document.

SUMMARY

The foregoing discussed drawbacks and deficiencies of the prior art are overcome or alleviated by a method for creating executable document and repository links within a virtual workplace environment. In an exemplary embodiment, the method includes capturing steps corresponding to a user navigation through a central database accessible by defined members of a collaborative groupware application; and creating and inserting one or more executable scripts as an attachment to an electronic communication initiated by the user, the executable scripts corresponding to the captured steps taken in accessing a specific database file; wherein any of the defined members of the collaborative groupware application receiving the electronic communication has the capability of directly navigating to the location of the specific database file by activating the attachment.

In another embodiment, a system for creating executable document and repository links within a virtual workplace environment includes a computing network configured for group collaboration capability, the network further including one or more client devices in communication with a central database upon selection and invitation to participate in a collaborative groupware application. The computing network network is further configured to capture steps corresponding to a user navigation through the central database, and create and insert one or more executable scripts as an attachment to an electronic communication initiated by the user, the executable scripts corresponding to the captured steps taken in accessing a specific database file. Any of the defined members of the collaborative groupware application receiving the electronic communication has the capability of directly navigating to the location of the specific database file by activating the attachment.

In still another embodiment, a computer program product includes a computer readable computer program code for creating executable document and repository links within a virtual workplace environment, and instructions for causing a computer to implement a method. The method further includes capturing steps corresponding to a user navigation through a central database accessible by defined members of a collaborative groupware application, and creating and inserting one or more executable scripts as an attachment to an electronic communication initiated by the user, the executable scripts corresponding to the captured steps taken in accessing a specific database file, wherein any of the defined members of the collaborative groupware application receiving the electronic communication has the capability of directly navigating to the location of the specific database file by activating the attachment.

BRIEF DESCRIPTION OF THE DRAWINGS

Referring to the exemplary drawings wherein like elements are numbered alike in the several Figures.

DETAILED DESCRIPTION

Disclosed herein is method an system for creating executable document and repository links within virtual workplace environments. Briefly stated, a collaborative virtual workplace system is configured with the capability of creating executable scripts of the steps that a user has taken to access a document before a document link is copied to a communication such as an e-mail message. The "captured" steps in accessing a document are inserted in the communication as a separate attachment, and can thereafter be executed by clicking on the attachment. Such an attachment further has the additional property of being able to be stored in document as an icon, with the specific captured steps being invisible to the user. Thereby, when a user wishes to access both the database and the original document, the user need only click on the attached icon.

Figure 1:
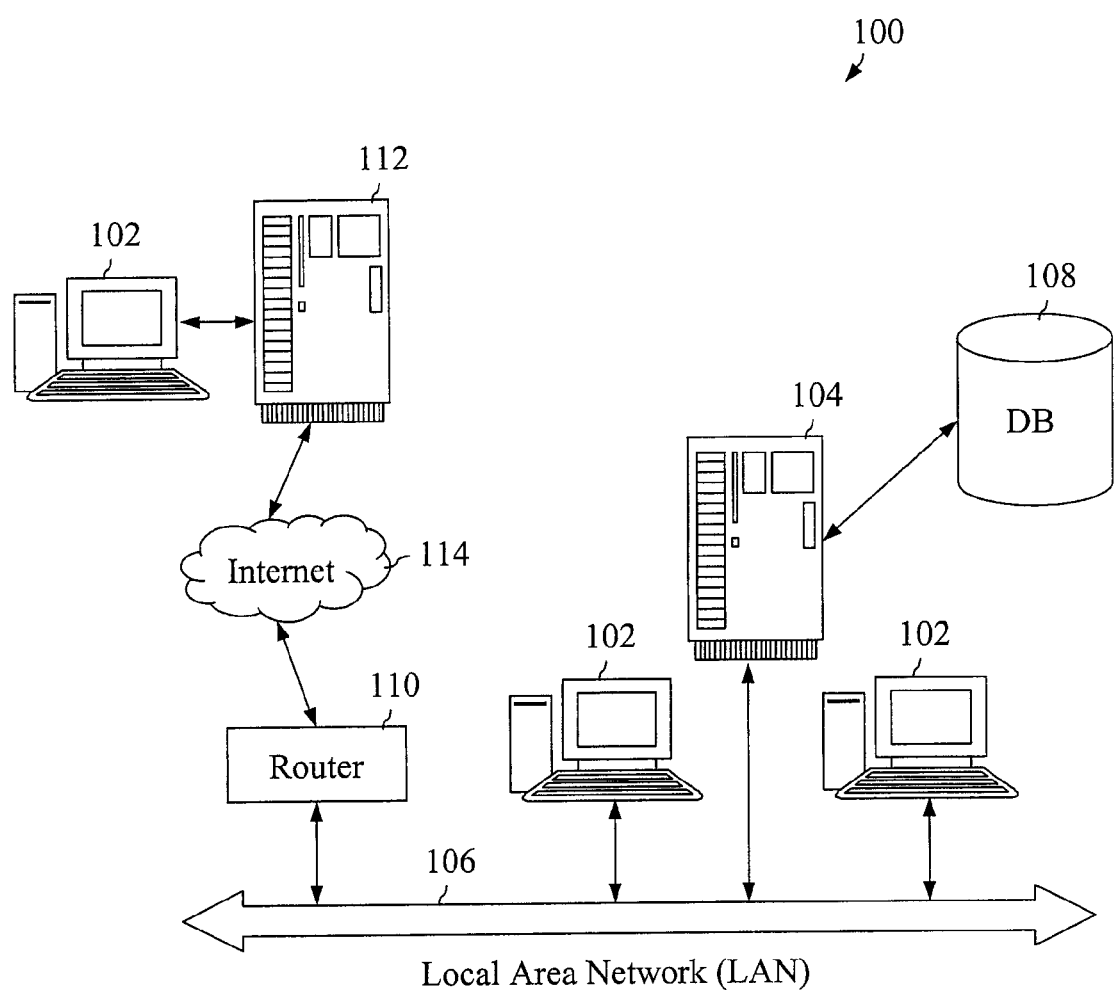
FIG. 1 is a schematic block diagram of an exemplary computer networking system group collaboration capability, suitable for use in accordance with an embodiment of the invention.

Referring initially to FIG. 1, there is shown a schematic block diagram of an exemplary computer networking system 100 with group collaboration capability, suitable for use in accordance with an embodiment of the invention. As is shown, one or more client devices 102 communicate (upon selection and invitation) with a centralized database server 104 over a network 106. In an exemplary embodiment, the network 106 is a Local Area Network (LAN) using TCP/IP protocol over Ethernet. However, the network 106 may represent any other class of network known in the art (e.g., the Internet, an Intranet, a Wide Area Network (WAN), Storage Area Network (SAN), etc.), using any physical network interface (e.g., Ethernet, 802.11 Wireless networking, HPNA, HomePlug, IEEE-1394, etc.) and any network communication protocol (e.g., TCP/IP, UDP/IP, RTP, HTTP, RTSP, SSL, etc.). The database server 104 connected to the LAN 106 communications with a central storage database 108, which may represent any type of non-volatile storage known in the art (e.g., hard disk drive, an array of hard disk drives, optical disk, non-volatile semiconductor memory, etc.) that can be used to store application programs, data files, digital media content, etc.

The client device 102 may represent any type of computational device known in the art such as, for example, a workstation, personal computer, client server, laptop, hand held computer, telephone device, network appliance, etc. Furthermore, the system 100 may include multiple client devices capable of communicating with the server 104 and central database 108 over the network 106 that each includes the components and capabilities described with respect to the client device 102.

As further illustrated in FIG. 1, the system 100 may also include a router 110 that provides remote client devices 102 (e.g., a PC not directly connected to the local network 106) access to the database server 104 and central database 108 over the internet 114. Depending on the exact type of network being used and the specific topology of the network configuration created, a remote client device 102 could also access server 104 directly over the local network 106, through a direct connection from the remote client device 102 to the internet 116 or through other means without utilizing the router 110.

As indicated above, a characteristic of a computer network system configured with group collaboration products (i.e., groupware) is that users converge on a central repository (e.g., central database 108) to retrieve and exchange data and information. Previously, if a user wanted to have other team members refer to a database document, the more likely approach to doing so would be to send an e-mail communication with a copy of the database document attached. However, this is not the same as having each team member independently navigate to the location within the database 108 containing the document. Such a capability may be desired, for example, where the database location includes other relevant documents that may not have been attached to the e-mail message, or where a team member desired to view an updated version of the document at a later point in time.

Figure 2A:
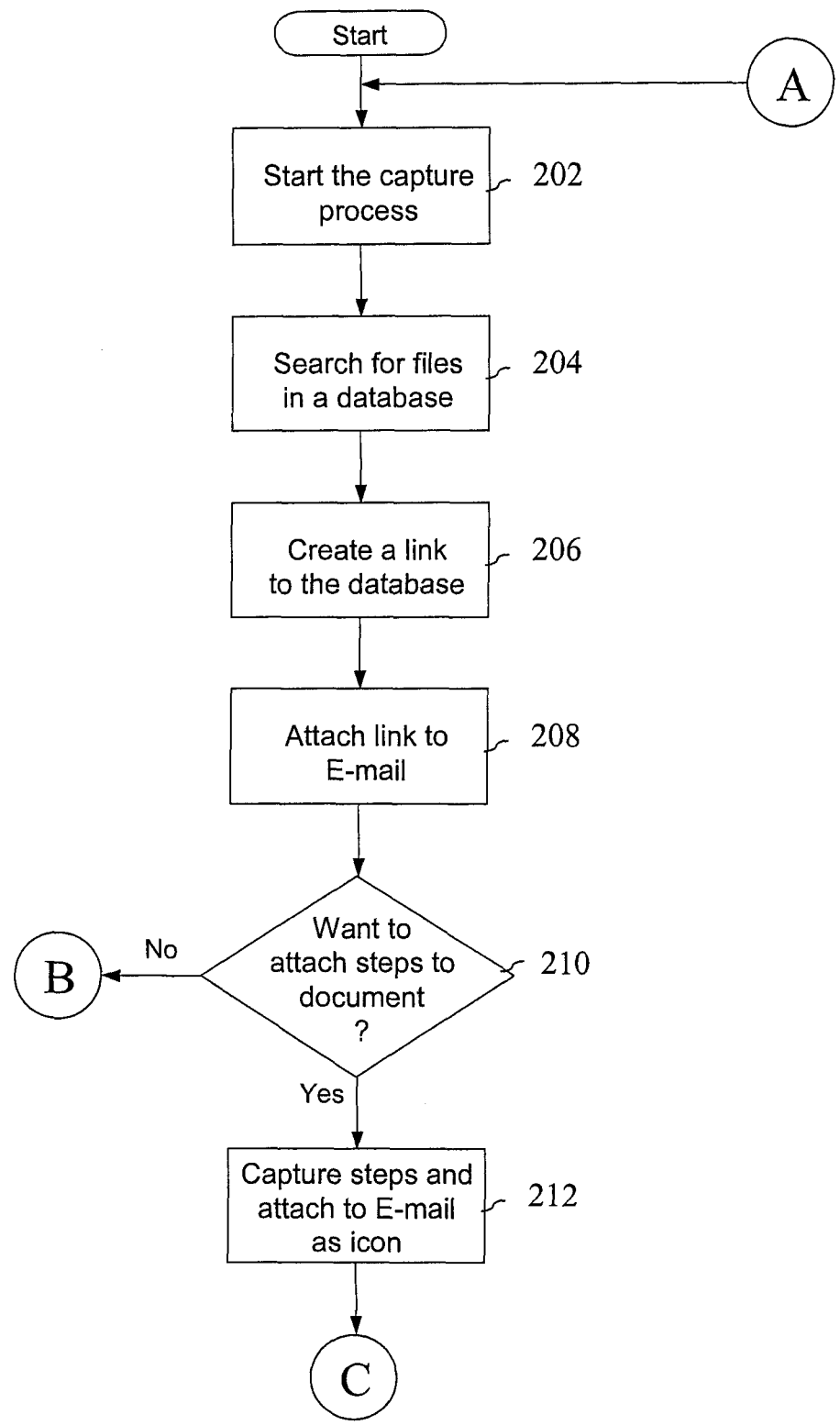
FIGS. 2(a) and 2(b) are a flow diagram illustrating a method for creating executable document and repository links within virtual workplace environments, in accordance with an embodiment of the invention.
Figure 2B:
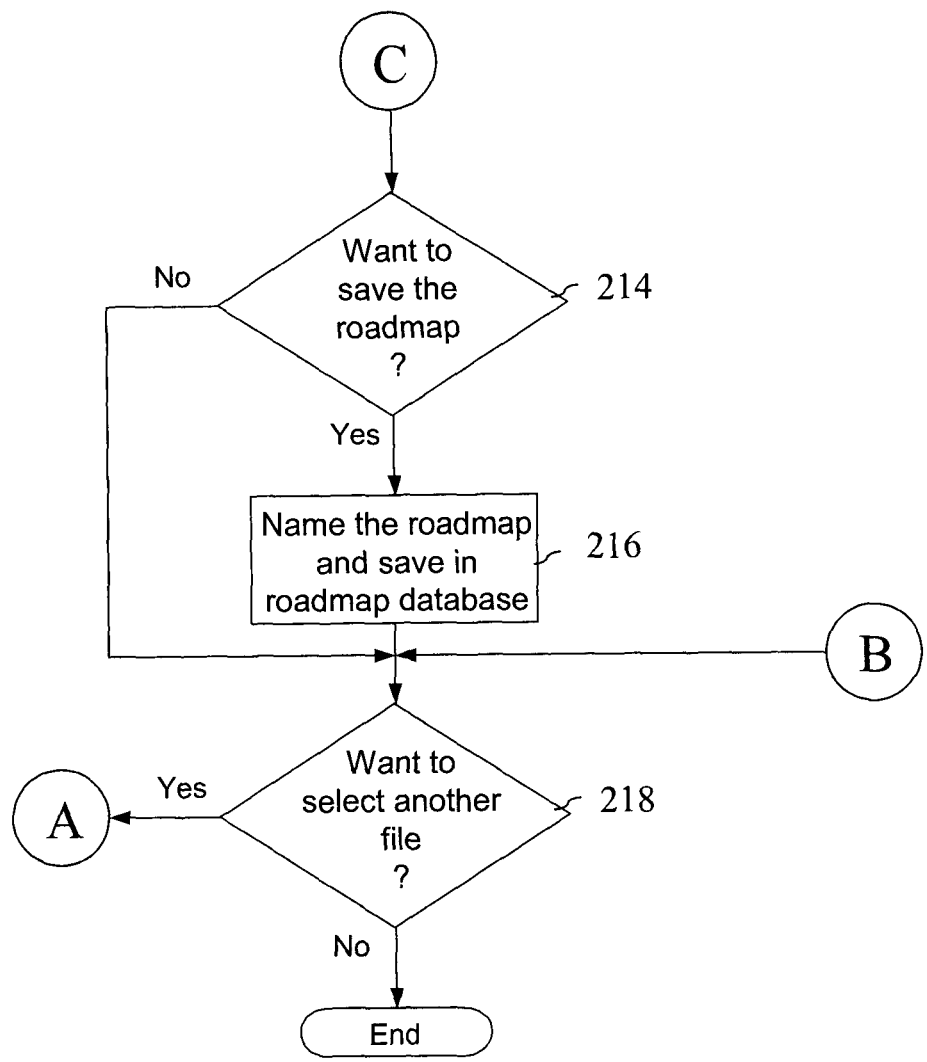

Accordingly, FIGS. 2(*a*) and 2(*b*) are a flow diagram illustrating a method 200 for creating executable document and repository links within virtual workplace environments, in accordance with an embodiment of the invention. The method 200 begins at block 202 for commencement of a capture process of the steps taken in locating a database document, wherein the steps are translated into executable scripts. As shown in block 204, this capture process begins as a user searches for files in a database (e.g., central database 108 of FIG. 1). As files are searched (i.e., the user is navigating through the database, the path taken by the user is automatically recorded (e.g., by the database server 104).

At some point during the navigation process, the user will locate one or more files to be shared with other users (e.g., team members in a group collaboration). As then shown in block 206, the user creates a link to the location in the database corresponding to the desired file to be distributed to the team members. The user then attaches the link to an e-mail message as shown in block 208. At this point, the user has only created a document block 210, the user may decide to provide other team members with the capability of navigating directly to the database location of the linked document. If this is the case, the method proceeds to block 212, where the captured steps are attached to the e-mail message in the form of an icon that, when "clicked," runs executable scripts corresponding to the captured steps. The actual captured steps are transparent with respect to the e-mail recipient.

The executable scripts retrieve the database navigation path that was previously recorded. In an exemplary embodiment, each file in the database hierarchy of files becomes a distinct cap, with each step having a button that (when selected) advances the team member's computer screen to the next step in the hierarchy. A "back" button is also included in the second and succeeding steps so that reverse navigation is enabled. In addition, when advancing down the database navigation path the ability to also select (uniform resource locators) URLs from each web page is also preserved. Thus, a user may digress from the database navigation path to the desired document and then return back to the path to proceed to access the document.

In the event that the user does not want to attach the captured steps (which may also be referred to as a "roadmap"), the method may feed forward from decision block 210 in FIG. 2(*a*) through path "B" as described below. Otherwise, at the bottom of FIG. 2(*a*) method 200 proceeds through path "C" to decision block 214 of FIG. 2(*b*). At this point, the user further has the option of saving the captured steps (i.e., the roadmap) as its own database file. If this is the case, the method proceeds to block 216 where the roadmap is given a file name and saved to a roadmap database. The roadmap database may be, for example, the central database 108 or another separate database. As the icon representing the executable script to the document is attached to the e-mail, the icon may also be detached from the e-mail and stored in a folder for later use.

Finally, at decision block 218, it is determined whether the user is selecting another file within the database. If not, the process ends, otherwise, the method 200 loops back to block 202 of FIG. 2(*a*) through path "A."

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for creating executable document and repository links within a virtual workplace environment, the method comprising:
   capturing, by a server device, steps corresponding to a user navigation through a central database accessible by defined members of a collaborative groupware application; and
   creating and inserting one or more executable scripts as an attachment to an electronic communication initiated by the user, the executable scripts including the captured steps taken by the user navigation in accessing a specific database file;
   wherein any of the defined members of the collaborative groupware application receiving the electronic communication has the capability of directly navigating to the location of the specific database file by activating the attachment.

2. The method of claim 1, wherein the executable scripts are attached to the electronic communication in the form of an icon.

3. The method of claim 1, wherein the executable scripts of the attachment are configured for permitting recipients of the electronic communication to implement both forward and backward navigation within the database, with respect to the captured steps.

4. The method of claim 3, wherein the attachment is further configured to permit selection of (uniform resource locators) URLs while also preserving forward and backward navigation capability within the database.

5. The method of claim 3, wherein the captured steps are transparent with respect to the recipients of the electronic communication.

6. The method of claim 1, wherein the attachment is further configured to be stored as an independent file within the central database, as well as within another database other than the central database.

7. The method of claim 1, further comprising inserting a database link to the electronic communication, the database link comprising a copy of the specific database file.

8. A system for creating executable document and repository links within a virtual workplace environment, comprising:
   a computing network configured for group collaboration capability, the network further comprising one or more client devices in communication with a central database upon selection and invitation to participate in a collaborative groupware application;
   the computing network further configured to:
      capture, by a server device, steps corresponding to a user navigation through the central database; and
      create and insert one or more executable scripts as an attachment to an electronic communication initiated by the user, the executable scripts containing the captured steps taken by the user navigation in accessing a specific database file;
      wherein any of the defined members of the collaborative groupware application receiving the electronic communication has the capability of directly navigating to the location of the specific database file by activating the attachment.

9. The system of claim 8, wherein the executable scripts are attached to the electronic communication in the form of an icon.

10. The system of claim 8, wherein the executable scripts of the attachment are configured for permitting recipients of the electronic communication to implement both forward and backward navigation within the database, with respect to the captured steps.

11. The system of claim 10, wherein the attachment is further configured to permit selection of (uniform resource locators) URLs while also preserving forward and backward navigation capability within the database.

12. The system of claim 10, wherein the captured steps are transparent with respect to the recipients of the electronic communication.

13. The system of claim 8, wherein the attachment is further configured to be stored as an independent file within the central database, as well as within another database other than the central database.

14. The system of claim 8, wherein the electronic communication further comprises a database link inserted therein, the database link comprising a copy of the specific database file.

15. A computer program product comprising:
   a non-transitory, computer readable storage medium having instructions stored thereon that, when executed by a computer, implement a method for creating executable document and repository links within a virtual workplace environment, the method further comprising:
      capturing, by a server device, steps corresponding to a user navigation through a central database accessible by defined members of a collaborative groupware application; and
   creating and inserting one or more executable scripts as an attachment to an electronic communication initiated by the user, the executable scripts including the captured steps taken by the user navigation in accessing a specific database file;
      wherein any of the defined members of the collaborative groupware application receiving the electronic communication has the capability of directly navigating to the location of the specific database file by activating the attachment.

16. The computer program product of claim 15, wherein the executable scripts are attached to the electronic communication in the form of an icon.

17. The computer program product of claim 15, wherein the executable scripts of the attachment are configured for permitting recipients of the electronic communication to implement both forward and backward navigation within the database, with respect to the captured steps.

18. The computer program product of claim 17, wherein the attachment is further configured to permit selection of (uniform resource locators) URLs while also preserving forward and backward navigation capability within the database.

19. The computer program product of claim 17, wherein the captured steps are transparent with respect to the recipients of the electronic communication.

20. The computer program product of claim 15, wherein the attachment is further configured to be stored as an independent file within the central database, as well as within another database other than the central database.

* * * * *